May 8, 1923. 1,454,558
W. G. PATON
STRAW SALTING AND FERTILIZING
Filed Jan. 16, 1922
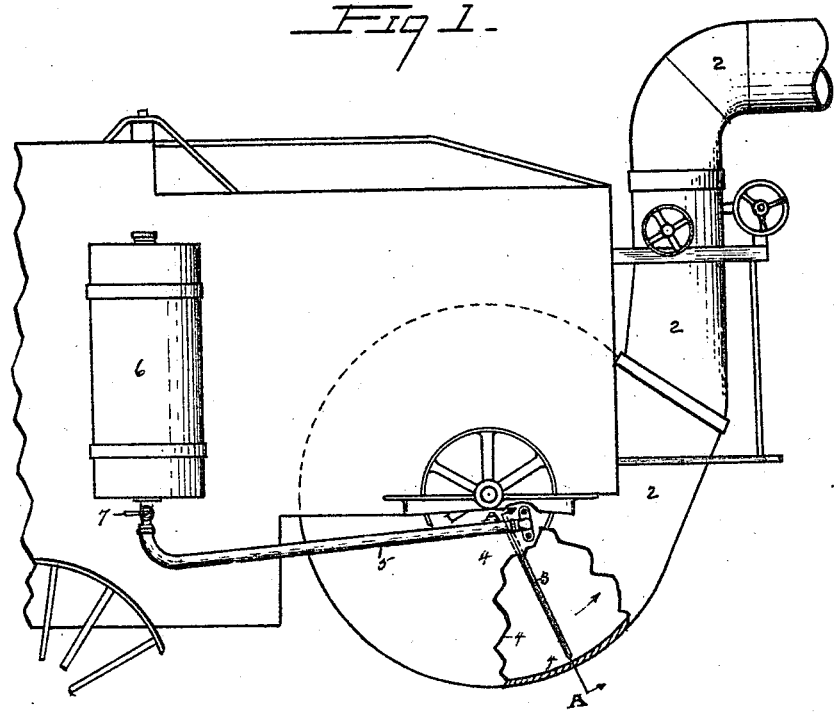
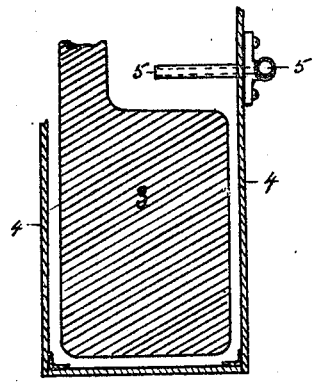
W. G. Paton
Inventor
By Macdonald & Lench
Atty.

Patented May 8, 1923.

1,454,558

UNITED STATES PATENT OFFICE.

WILLIAM G. PATON, OF TORONTO, ONTARIO, CANADA.

STRAW SALTING AND FERTILIZING.

Application filed January 16, 1922. Serial No. 529,764.

*To all whom it may concern:*

Be it known that I, WILLIAM GEORGE PATON, of the city of Toronto, in the county of York, in the Province of Ontario, in the Dominion of Canada, mechanic, have invented certain new and useful Improvements in Straw Salting and Fertilizing, do hereby declare that the following is a full, clear, and exact description of the same.

My invention relates to improvements in salting or adding fertilizer to straw during the threshing of grain. When the straw is to be used for feeding stock a salt solution or other liquor may be used in any quantity desired. We may hasten the decay of the straw by adding ammonia, nitrates, phosphates or any other combination of substances that it may be desired to add to the soil.

The objects of my invention are, first to distribute evenly a small quantity of salt in straw as it is being threshed thereby increasing the fodder value of the straw. Second, to distribute evenly ammonia or other chemical substance in straw as it is being threshed, so as to act either as a preservative or a fertilizer which would cause preservation or rapid decay of the straw.

I attain these objects by the device illustrated in the accompanying drawing in which, Figure 1. is a side elevation of the entire device showing the rear portion of a modern threshing machine equipped with a penumatic stacker showing one manner of attaching my invention, a portion of the fan casing being removed to show the relative position of the fan. Figure 2. is a cross section upon line A—A of Figure 1.

Similar numerals refer to similar parts in both views.

The threshing machine 1, provided with a pneumatic straw stacker 2, with a fan 3, in a fan casing 4, through which casing 4, is projected a supply pipe 5, which is connected with a gravity supply tank 6, equipped with a valve 7. A salt solution or other chemical matter is poured into gravity supply tank 6, and its flow through supply pipe 5, is regulated by valve 7. This salt solution or other chemical combination falling from the end of supply pipe 5 upon revolving fan 3, is cast off and distributed in small particles in the direction of the air current through the stacker and mixes with the straw.

The essential feature of my invention consists of a reservoir or storage tank mounted preferably on the framework of the threshing machine with its bottom above the centre of the stacker fan box. The supply tank having suitable connection for conveying the brine or liquor from the supply tank to a point inside the stacker fan box discharging it so that it may fall upon the revolving fan and is thereby distributed in atomized form evenly through the straw during its discharge through the stacker pipe.

I prefer the arrangement as above described but where desired the tank may be located at any convenient point independent of the framework of the threshing machine and a small independent fan or blower may be used for atomizing brine or other liquid in any similar manner as above described and discharged into the stacker fan box or into the stacker pipe.

Having thus described my invention and the manner of its use, what I therefore claim as my invention and desire to secure by Letters Patent is:

1. In a straw salter and fertilizer in combination with a threshing machine equipped with pneumatic straw stacker a gravity supply tank having suitable pipe connection for conveying liquid to the inside of the fan box or fan housing of the stacker and suitable valve control on said pipe connection.

2. In a straw salter and fertilizer in combination with a threshing machine equipped with a pneumatic straw stacker a gravity supply tank with suitable pipe connection for conveying liquid from the said supply tank by gravity to a point inside the fan casing of the stacker with suitable valve control on said pipe connection regulating the fall of liquid on the revolving stacker fan.

3. In a straw salter and fertilizer in combination with a threshing machine equipped with a pneumatic straw stacker a gravity supply tank having suitable pipe connection for conveying liquid to the inside of the fan at a point below the stacker fan shaft and to the rear of the vertical centre line of said fan housing being approximately at a point forming an angle of about 45 degrees with the centre of the fan shafting and the vertical centre line of same.

W. G. PATON.